United States Patent
Kumabe

(10) Patent No.: US 10,078,963 B2
(45) Date of Patent: Sep. 18, 2018

(54) IN-VEHICLE UNIT

(71) Applicant: DENSO CORPORATION, Kariya, Aichi-pref. (JP)

(72) Inventor: Seigou Kumabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/537,217

(22) PCT Filed: Dec. 22, 2015

(86) PCT No.: PCT/JP2015/006367
§ 371 (c)(1),
(2) Date: Jun. 16, 2017

(87) PCT Pub. No.: WO2016/113814
PCT Pub. Date: Jul. 21, 2016

(65) Prior Publication Data
US 2017/0352265 A1 Dec. 7, 2017

(30) Foreign Application Priority Data
Jan. 15, 2015 (JP) .................... 2015-006175

(51) Int. Cl.
G08G 1/13 (2006.01)
G08G 1/09 (2006.01)
(Continued)

(52) U.S. Cl.
CPC ....... *G08G 1/094* (2013.01); *G08G 1/096716* (2013.01); *G08G 1/096791* (2013.01); *H04W 4/046* (2013.01); *G08B 25/10* (2013.01)

(58) Field of Classification Search
None
See application file for complete search history.

(56) References Cited

U.S. PATENT DOCUMENTS 4,403,208 A * 9/1983 Hodgson ................ G08G 1/161
340/902
5,841,367 A * 11/1998 Giovanni ................ B60Q 1/52
340/436
(Continued)

FOREIGN PATENT DOCUMENTS

JP 2007048302 A 2/2007
JP 2010126130 A 6/2010
(Continued)

OTHER PUBLICATIONS

U.S. Appl. No. 15/537,192, filed Jun. 16, 2017, Kumabe.
U.S. Appl. No. 15/537,252, filed Jun. 16, 2017, Kumabe.

*Primary Examiner* — K. Wong
(74) *Attorney, Agent, or Firm* — Harness, Dickey & Pierce, P.L.C.

(57) ABSTRACT

An in-vehicle unit, which is used in each of host vehicles including a subject vehicle and nearby vehicles, includes an inter-vehicle communicator to perform inter-vehicle communication. The in-vehicle unit in the subject vehicle includes a criterion value setting section and a different-unit anomaly detection section. The criterion value setting section receives a different-unit installation state index via the inter-vehicle communicator and sets successively a criterion value of an installation state index from the received different-unit installation state index specified based on an output value from a sensor instrument that successively outputs an output value corresponding to an installation state of the in-vehicle unit on each nearby vehicle. The different-unit anomaly detection section detects an abnormal installation state of the in-vehicle unit on a target nearby vehicle by comparing the criterion value with the different-unit installation state index received from the target nearby vehicle.

11 Claims, 5 Drawing Sheets

(51) Int. Cl.
*H04W 4/04* (2009.01)
*G08G 1/0967* (2006.01)
*G08B 25/10* (2006.01)

(56) References Cited

U.S. PATENT DOCUMENTS

| | | | | |
|---|---|---|---|---|
| 7,098,804 B2* | 8/2006 | Tringali | ............... | G08G 1/0965 |
| | | | | 340/902 |
| 7,099,776 B2* | 8/2006 | King | ...................... | G01C 21/26 |
| | | | | 340/902 |
| 9,604,641 B2* | 3/2017 | Al-Stouhi | ....... | B60W 30/18154 |
| 2013/0088369 A1 | 4/2013 | Yu et al. | | |
| 2015/0348416 A1 | 12/2015 | Fujita et al. | | |

FOREIGN PATENT DOCUMENTS

| | | | |
|---|---|---|---|
| JP | 2013084236 A | 5/2013 | |
| JP | 2014191485 A | 10/2014 | |

* cited by examiner

IN-VEHICLE UNIT

CROSS REFERENCE TO RELATED APPLICATIONS

This application is a U.S. National Phase Application under 35 U.S.C. 371 of International Application No. PCT/JP2015/006367 filed on Dec. 22, 2015 and published in Japanese as WO 2016/113814 A1 on Jul. 21, 2016. This application is based on and claims the benefit of priority from Japanese Patent Application No. 2015-006175 filed on Jan. 15, 2015. The entire disclosures of all of the above applications are incorporated herein by reference.

TECHNICAL FIELD

The present disclosure relates to an in-vehicle unit that performs wireless communication.

BACKGROUND ART

There is known a technology that detects an anomaly in an in-vehicle unit and notifies a center of the anomaly. For example, Patent Literature 1 discloses the technology that uses a shock sensor included in an in-vehicle unit to detect an anomaly in the in-vehicle unit and notifies a center of the anomaly.

Moreover, there is known a system in which an in-vehicle unit wirelessly communicates with an in-vehicle unit of another vehicle or a roadside instrument and thereby provides a driver of a unit-mounted vehicle (also referred to as a host vehicle) with various services (hereinafter referred to as in-vehicle communication services). There is known an example system in which the in-vehicle unit measures a host vehicle position using a positioning instrument of a satellite positioning system included in the in-vehicle unit itself, transmits information including the host vehicle position to an in-vehicle unit of another vehicle or a roadside instrument, and thereby provides a driver of the host vehicle with an in-vehicle communication service corresponding to the host vehicle position.

PRIOR ART LITERATURES

Patent Literature

Patent Literature 1: JP 2007-048302 A

SUMMARY OF INVENTION

An abnormal installation state such as hiding the in-vehicle unit in a glove box is highly likely to influence a communication capability or a positioning capability of the positioning instrument included in the in-vehicle unit and is supposed to greatly influence the quality of the above-mentioned in-vehicle communication service. Thus detecting an abnormal installation state is desired.

The determination of whether an installation state of the in-vehicle unit is abnormal is difficult by using only a sensor included in the in-vehicle unit itself, unlike the technology disclosed in Patent Literature 1 to detect an anomaly in the in-vehicle unit. More specifically, only a sensor included in the in-vehicle unit itself cannot easily determine whether the abnormal installation state is caused by an anomaly in the in-vehicle unit itself only or by an environmental factor such as vibration due to a rough road, not limited to the in-vehicle unit itself.

It is an object of the present disclosure to accurately detect an abnormal installation state of an in-vehicle unit installed on a vehicle.

According to a first example of the present disclosure, an in-vehicle unit is provided to be used in each of a plurality of host vehicles including a subject vehicle and a plurality of nearby vehicles near the subject vehicle while including an inter-vehicle communicator to transmit and receive information using inter-vehicle communication. The in-vehicle unit used in the subject vehicle includes a criterion value setting section and a different-unit anomaly detection section. The criterion value setting section receives a different-unit installation state index that is transmitted via the inter-vehicle communicator using the inter-vehicle communication and sets successively a criterion value of an installation state index from the received different-unit installation state index; the different-unit installation state index is specified based on an output value from a sensor instrument that successively outputs an output value corresponding to an installation state of the in-vehicle unit on each of the nearby vehicles. The different-unit anomaly detection section detects an abnormal installation state of the in-vehicle unit on a target nearby vehicle that is a predetermined diagnosis target among the nearby vehicles by comparing the criterion value set by the criterion value setting section with the different-unit installation state index received via the inter-vehicle communicator from the target nearby vehicle.

The criterion value setting section successively sets a criterion value from installation state indexes the inter-vehicle communicator receives from a plurality of nearby vehicles. The criterion value can be set as needed from a set of installation state indexes received from a nearby vehicle that is positioned so near as to be capable of inter-vehicle communication with the in-vehicle unit of the subject vehicle. The criterion value is used as a criterion for installation state indexes. Suppose a change occurs and is not limited to particular vehicles. For example, an environmental factor changes the installation state index equally on vehicles that are positioned near the subject vehicle. In such a case, the criterion value also varies with the change. However, an influence on the criterion value is alleviated when a change in the installation state index is limited to particular nearby vehicles. In this case, a variation in the criterion value is suppressed.

The criterion value is therefore compared with the installation state index to accurately detect a change in the installation state index of the in-vehicle unit limited to particular nearby vehicles as distinguished from a change in the installation state index that is not limited to particular vehicles. The installation state index is specified based on an output value from the sensor that successively outputs an output value corresponding to an installation state of the in-vehicle unit on a vehicle. A change in the installation state index of the in-vehicle unit limited to a particular nearby vehicle therefore signifies an abnormal installation state of the in-vehicle unit.

The different-unit anomaly detection section compares the criterion value set by the criterion value setting section with an installation state index (i.e., a different-unit installation state index) that is received from a nearby vehicle as a target by the inter-vehicle communicator and concerns the in-vehicle unit of the nearby vehicle. The different-unit anomaly detection section can thereby accurately detect an abnormal installation state of the in-vehicle unit on the targeted nearby vehicle.

According to a second example of the present disclosure, an in-vehicle unit is provided to be used in each of a plurality of host vehicles including a subject vehicle and at least one nearby vehicle near the subject vehicle. Each in-vehicle unit includes a sensor instrument that successively outputs an output value corresponding to an installation state of the in-vehicle unit itself on each host vehicle, and an inter-vehicle communicator to transmit and receive information using inter-vehicle communication. The in-vehicle unit used in the subject vehicle includes a criterion value setting section, a self-unit installation state index specification section, and a self-unit anomaly detection section. The criterion value setting section receives a different-unit installation state index that is transmitted via the inter-vehicle communicator using the inter-vehicle communication, and sets successively a criterion value of an installation state index from the received different-unit installation state index; the different-unit installation state index is specified based on an output value from the sensor instrument that successively outputs an output value corresponding to an installation state of the in-vehicle unit on each of the at least one nearby vehicle. The self-unit installation state index specification section specifies a self-unit installation state index concerning the in-vehicle unit in the subject vehicle based on an output value from the sensor instrument in the in-vehicle unit in the subject vehicle. The self-unit anomaly detection section detects an abnormal installation state of the in-vehicle unit on the subject vehicle by comparing the criterion value set by the criterion value setting section with the self-unit installation state index specified by the self-unit installation state index specification section.

The criterion value setting section successively sets a criterion value from installation state indexes (i.e., different-unit installation state indexes) that are received via the inter-vehicle communicator from a plurality of nearby vehicles. The criterion value can be set as needed from a set of installation state indexes received from a nearby vehicle positioned so near as to be capable of inter-vehicle communication with the in-vehicle unit of the subject vehicle. The criterion value is used as a criterion for installation state indexes. Suppose a change occurs and is not limited to particular vehicles. For example, an environmental factor changes the installation state index equally on vehicles that are positioned near the subject vehicle. In such a case, the criterion value also varies with the change. However, an influence on the criterion value is alleviated when a change in the installation state index is limited to particular nearby vehicles. In this case, a variation in the criterion value is suppressed.

The criterion value is therefore compared with the installation state index to accurately detect a change in installation state index of in-vehicle unit limited to subject vehicle as distinguished from a change in the installation state index that is not limited to subject vehicle. The installation state index is specified based on an output value from the sensor that successively outputs an output value corresponding to an installation state of the in-vehicle unit on a vehicle. A change in the installation state index of the in-vehicle unit limited to the subject vehicle therefore signifies an abnormal installation state of the in-vehicle unit on the subject vehicle.

The self-unit anomaly detection section compares the criterion value set by the criterion value setting section with an installation state index that is specified in the subject vehicle by the installation state index specification section and concerns the in-vehicle unit of the subject vehicle. The self-unit anomaly detection section can thereby accurately detect an abnormal installation state of the in-vehicle unit on the subject vehicle.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION (First Embodiment)
<Schematic Configuration of a Communication System 100>

Figure 1:
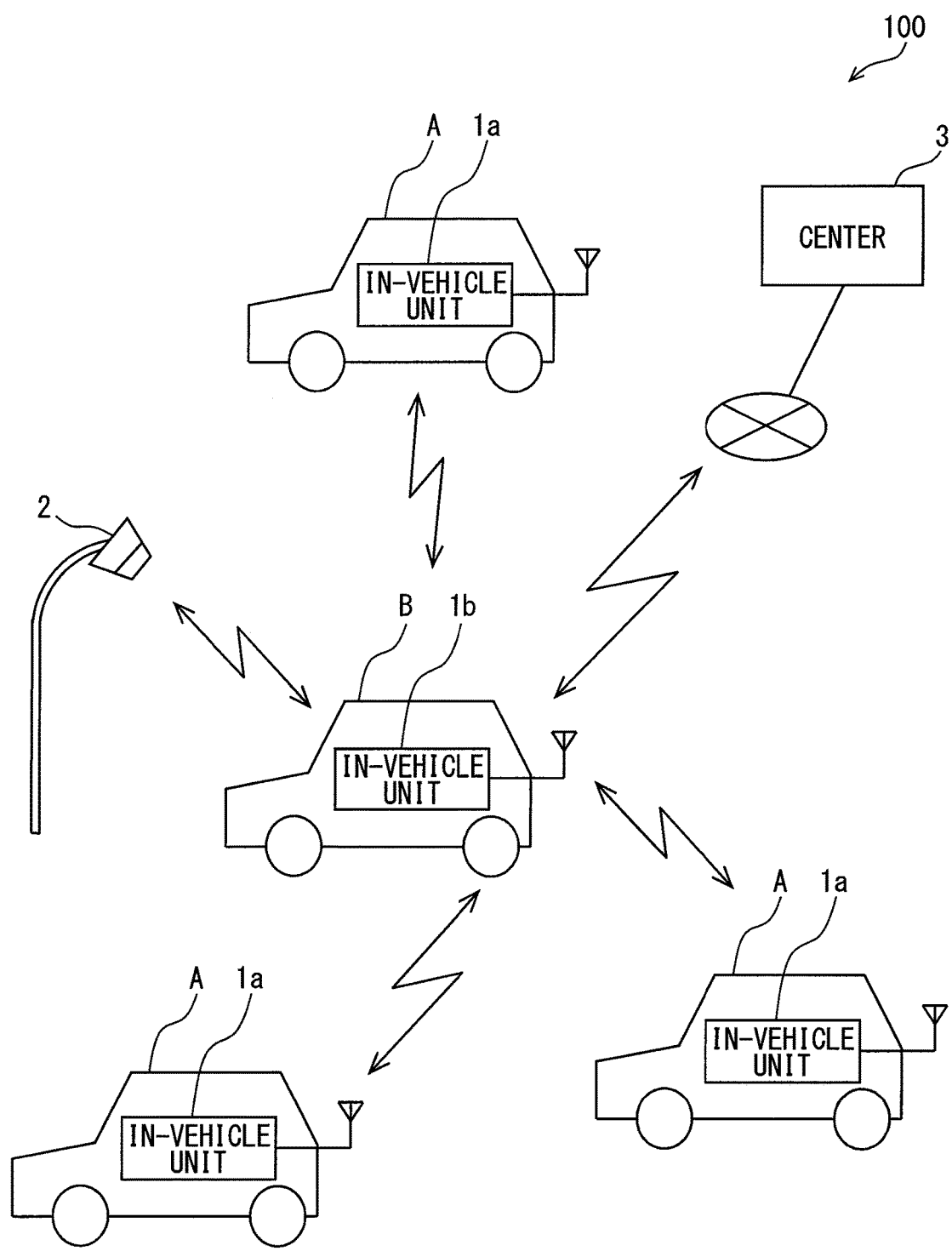
FIG. 1 is a diagram illustrating a schematic configuration of a communication system.

Embodiments of the present disclosure will be described in further detail with reference to the accompanying drawings. FIG. 1 is a diagram illustrating a schematic configuration of a communication system 100 according to the present disclosure. The communication system 100 in FIG. 1 includes an in-vehicle unit 1b used in a vehicle B, an in-vehicle unit 1a used in each vehicle A near the vehicle B, a provider terminal 2 as a roadside instrument installed at the roadside, and a center 3. The vehicle B is hereinafter also referred to as a subject vehicle B or a first vehicle. The vehicle A is hereinafter also referred to as a nearby vehicle A, a second vehicle, or a different vehicle. A vehicle mounted with the in-vehicle unit is also referred to as a host vehicle that also applies to the vehicles A and B. The in-vehicle unit 1b is also referred to as a first in-vehicle unit. The in-vehicle unit 1a is also referred to as a nearby in-vehicle unit, a different in-vehicle unit, or a second in-vehicle unit. The in-vehicle unit 1a is referred to as a different in-vehicle unit when the in-vehicle unit 1b is referred to as an in-vehicle unit itself. The in-vehicle unit 1b is referred to as a different in-vehicle unit when the in-vehicle unit 1a is referred to as an in-vehicle unit itself.

The communication system 100 in FIG. 1 includes three in-vehicle units 1a each used in three nearby vehicles, but is not limited thereto. The communication system 100 may include at least one or a plurality of in-vehicle units 1a without need to be limited to three in-vehicle units 1a.

The in-vehicle unit 1a and the in-vehicle unit 1b wirelessly communicate to transmit and receive information without using a communication network. Namely, the in-vehicle unit 1a and the in-vehicle unit 1b perform inter-vehicle communication. The information is used as being not only uncountable but also countable. The inter-vehicle communication may be available within a radius of approximately several tens to hundreds of meters, for example. The in-vehicle unit 1b and the provider terminal 2 wirelessly communicate to transmit and receive information without using a communication network. Namely, the in-vehicle unit 1b and the provider terminal 2 perform vehicle roadside communication.

The inter-vehicle communication and the vehicle roadside communication may use the same frequency band or different frequency bands. The inter-vehicle communication and the vehicle roadside communication may each use different frequencies in the same frequency band and perform communication during different periods when the inter-vehicle communication and the vehicle roadside communication use the same frequency band. The inter-vehicle communication or the vehicle roadside communication uses frequency bands such as 5.9 GHz, 5.8 GHz, and 700 MHz.

The in-vehicle unit 1b and the center 3 perform wide area communication using a communication network. The wide area communication uses a communication network such as a mobile telephone network or the Internet to perform communication.

The in-vehicle unit 1a and the in-vehicle unit 1b may be built in (i.e., installed on) a vehicle or may be separately brought into a vehicle and detachably attached to a holder. The in-vehicle unit 1a and the in-vehicle unit 1b are normally installed on the vehicle at a dashboard facing a windshield, for example. The in-vehicle unit 1a and the in-vehicle unit 1b will be described in detail later.

The provider terminal 2 performs the vehicle roadside communication with the in-vehicle unit 1b used in a vehicle positioned in a wireless communication area of the provider terminal 2 to exchange information about the service provision. The service includes automatic settlement at a drive-through, automatic settlement of parking fee at a pay parking lot, support for passing at an intersection, and provision of information about traffic congestion. The wireless communication area for the provider terminal 2 may be limited to a range that does not include an area where an unserviced vehicle passes.

The center 3 is provided as a server, for example, and receives a notification transmitted from the in-vehicle unit 1b using the wide area communication. The center 3 may include one server or a plurality of servers.

<Schematic Configuration of the In-Vehicle Unit 1a>

Figure 2:
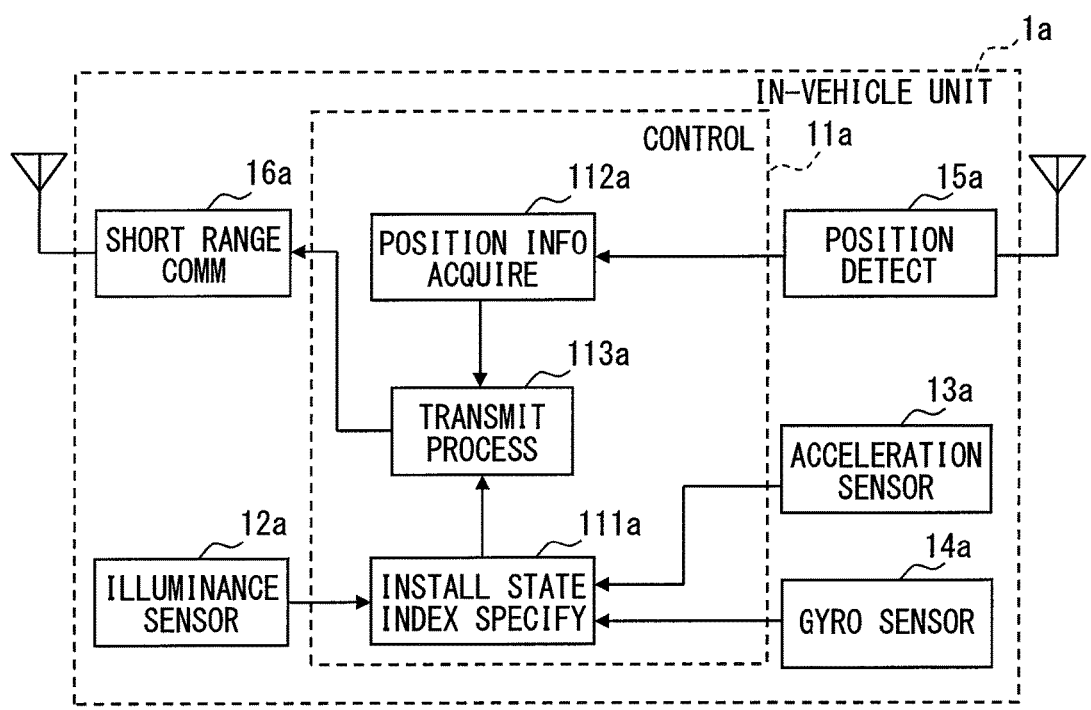
FIG. 2 is a diagram illustrating a schematic configuration of an in-vehicle unit of a nearby vehicle.

With reference to FIG. 2, the description below explains an example schematic configuration of the in-vehicle unit 1a used in the nearby vehicle A in relation to the subject vehicle B. As in FIG. 2, the in-vehicle unit 1a includes a controller 11a, an illuminance sensor 12a, an acceleration sensor 13a, a gyro sensor 14a, a position detector 15a, and a short range communicator 16a (also referred to as an inter-vehicle communicator).

The illuminance sensor 12a detects the illuminance around the in-vehicle unit 1a and successively outputs a signal corresponding to the detected illuminance. The illuminance output from the illuminance sensor 12a may be used to adjust the brightness of a display if included in the in-vehicle unit 1. The acceleration sensor 13a is built in the in-vehicle unit 1a and successively detects and outputs an acceleration generated in the in-vehicle unit 1a. The acceleration sensor 13a is provided as a 3-axis acceleration sensor, for example, that detects acceleration along three axes orthogonal to each other. The gyro sensor 14a is built in the in-vehicle unit 1a and detects an angular speed generated in the in-vehicle unit 1a. The gyro sensor 14a is provided as a 3-axis gyro sensor, for example, that detects change rates at the yaw, roll, and pitch angles. The acceleration sensor 13a and the gyro sensor 14a are assumed to maintain the same orientation of the three detection axes in relation to the in-vehicle unit 1a even when the in-vehicle unit 1a is used in different vehicles.

An incident condition of outside light depends on the installation state such as a position or a posture to install the in-vehicle unit 1a. An illuminance detected by the illuminance sensor 12a varies. The illuminance sensor 12a is therefore included in a sensor instrument. Output values from the acceleration sensor 13a and the gyro sensor 14a depend on the installation state such as a position or a posture to install the in-vehicle unit 1a. The acceleration sensor 13a and the gyro sensor 14a are also included in the sensor instrument. The acceleration sensor 13a and the gyro sensor 14a are based on inertia and are therefore also referred to as inertial sensors.

The position detector 15a includes a GNSS receiver used for GNSS (Global Navigation Satellite System) and successively detects a current position of the nearby vehicle A based on a signal received at an antenna from a positioning satellite. The GNSS is also referred to as a satellite positioning system. The positioned current position (hereinafter referred to as a vehicle position) is represented in latitude, longitude, and altitude, for example. The position detector 15a also detects a traveling direction of the nearby vehicle A based on successively positioned vehicle positions. The vehicle position and the traveling direction detected by the position detector 15a concerning the nearby vehicle A are also referred to as positioning information.

The position detector 15a may be configured to perform dead reckoning, namely, to complement a positioning result by using the dead-reckoning navigation that estimates the vehicle position based on an acceleration detected by the acceleration sensor 13a or a change rate (i.e., a yaw rate) of yaw angles detected by the gyro sensor 14a.

The short range communicator 16a performs inter-vehicle communication with the in-vehicle unit 1b existing within a communication range via a transmitting and receiving antenna. In more detail the short range communicator 16a transmits a signal in accordance with a directive from the controller 11a.

The controller 11a is also referred to as an electronic control unit or a control circuit. The controller 11a according to the embodiment includes a CPU, a memory unit such as ROM or RAM, I/O, and a bus to connect them. The controller 11a performs various processes by executing a control program stored in the ROM. The controller 11a will be described in detail later. One or more ICs as hardware may configure all or part of the functions implemented by the controller 11a.

<Schematic Configuration of the Controller 11a>

The description below explains an example of the schematic configuration of the controller 11a. As in FIG. 2, the controller 11a includes an installation state index specification section 111a, which may be also referred to as an installation state index specifier, a positioning information acquisition section 112a, which may be also referred to as a positioning information acquirer, and a transmission processing section 113a, which may be also referred to as a transmission processor.

The installation state index specification section 111a specifies an installation state index corresponding to the installation state of the in-vehicle unit 1a on the nearby vehicle A based on an illuminance detected by the illuminance sensor 12a, an acceleration detected by the acceleration sensor 13a and an angular speed detected by the gyro sensor 14a. The installation state index signifies any one of, all of, or a partial set of an illuminance detected by the illuminance sensor 12a, an installation posture angle of the in-vehicle unit 1a, and the time-variable quantity of an installation posture angle of the in-vehicle unit 1a.

An installation posture angle of the in-vehicle unit 1a may be specified from a three-axis acceleration detected by the acceleration sensor 13a. The time-variable quantity of an installation posture angle of the in-vehicle unit 1a may be specified from a change in the installation posture angle of the in-vehicle unit 1a that is successively specified from a three-axis acceleration detected by the acceleration sensor 13a. Alternatively, the time-variable quantity thereof may be specified by using an angular speed detected by the gyro sensor 14a.

The positioning information acquisition section 112a acquires positioning information such as a vehicle position or a traveling direction of the nearby vehicle A that is successively detected by the position detector 15a.

The transmission processing section 113a causes the short range communicator 16a to transmit the installation state index and the positioning information by using the inter-vehicle communication when the installation state index specification section 111a specifies the installation state index about the in-vehicle unit 1a and the positioning information acquisition section 112a acquires the positioning information about the nearby vehicle A. The short range communicator 16a is caused to transmit a set of the installation state index and the positioning information so as to indicate a state approximately at the same time based on a time stamp indicating the time to detect a sensor output value used to specify the installation state index and a time stamp indicating the time to detect the positioning information.

The short range communicator 16a may transmit the installation state index and the positioning information supplied with: an identifier such as a unit ID to identify the in-vehicle unit 1a as a transmission origin; and the time stamp indicating the time to detect the positioning information.

The installation state index may be transmitted at a predetermined cycle such as every 100 msec or at the time to detect a predetermined trigger. An example of the predetermined trigger is the time to start the vehicle roadside communication when the in-vehicle unit 1a is configured to perform also the vehicle roadside communication with a roadside instrument.

<Schematic Configuration of the In-Vehicle Unit 1b>

Figure 3:
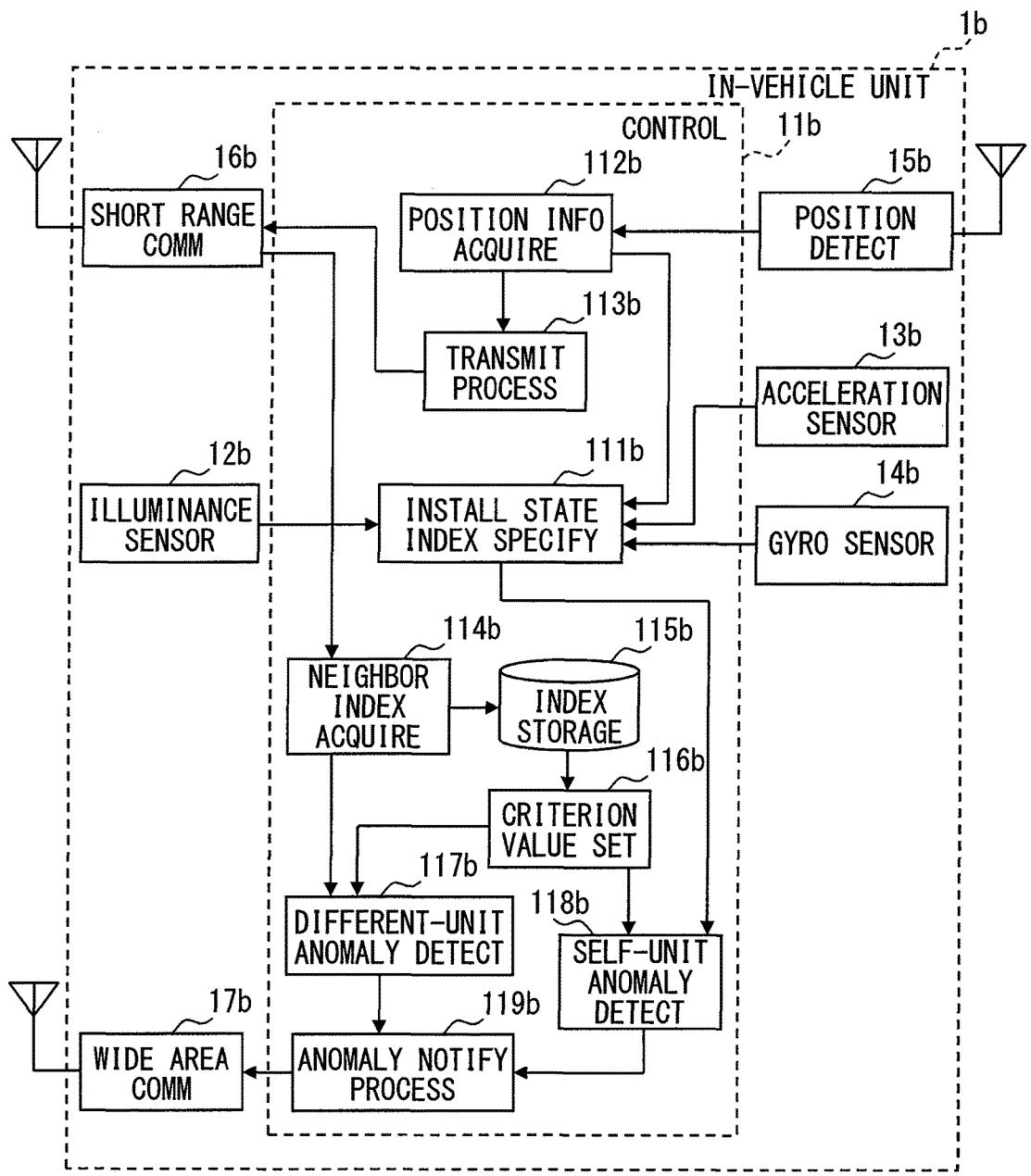
FIG. 3 is a diagram illustrating a schematic configuration of an in-vehicle unit on a subject vehicle.

With reference to FIG. 3, the description below explains an example schematic configuration of the in-vehicle unit 1b used in the subject vehicle B. As in FIG. 3, the in-vehicle unit 1b includes a controller 11b, an illuminance sensor 12b, an acceleration sensor 13b, a gyro sensor 14b, a position detector 15b, a short range communicator 16b (also referred to as an inter-vehicle or vehicle roadside communicator), and a wide area communicator 17b.

The illuminance sensor 12b, the acceleration sensor 13b, the gyro sensor 14b, and the position detector 15b are assigned different reference numerals for convenience sake, but equal to the illuminance sensor 12a, the acceleration sensor 13a, the gyro sensor 14a, and the position detector 15a above. The illuminance sensor 12b, acceleration sensor 13b, and the gyro sensor 14b are therefore also included in the sensor instrument. The acceleration sensor 13b and the gyro sensor 14b are also referred to as inertial sensors.

External shapes of the in-vehicle units 1a and 1b are almost identical. The orientation of three detection axes each of the acceleration sensor 13b and the gyro sensor 14b to the in-vehicle unit 1b equals the orientation of three detection axes each of the acceleration sensor 13a and the gyro sensor 14a to the in-vehicle unit 1a. The acceleration sensor 13a and the gyro sensor 14a therefore yield the same sensor output values as the acceleration sensor 13b and the gyro sensor 14b when the in-vehicle units 1a and 1b maintain the same installation state at the same location.

The position detector 15b detects a current position (i.e., a vehicle position) and a traveling direction of the subject vehicle B. As above, the vehicle position is represented in latitude, longitude, and altitude, for example.

The short range communicator 16b performs inter-vehicle communication with the in-vehicle unit 1a existing within a communication range and performs vehicle roadside communication with the provider terminal 2 via a transmitting and receiving antenna. In more detail the short range communicator 16b transmits a signal in accordance with a directive from the controller 11b. The short range communicator 16b is also referred to as an inter-vehicle communicator. The wide area communicator 17b communicates with the center 3 via a communication network such as a mobile telephone network or the Internet.

The controller 11b is also referred to as an electronic control unit or a control circuit. The controller 11b according to the embodiment includes a CPU, a memory unit such as ROM or RAM, I/O, and a bus to connect them. The controller 11b performs various processes by executing a control program stored in the ROM. The controller 11b will be described in detail later. One or more ICs as hardware may configure all or part of the functions implemented by the controller 11b.

<Schematic Configuration of the Controller 11b>

The description below explains an example of the schematic configuration of the controller 11b. As in FIG. 3, the controller 11b includes an installation state index specification section 111b, which may be also referred to as an installation state index specifier, a positioning information acquisition section 112b, which may be also referred to as a positioning information acquirer, a transmission processing section 113b, which may be also referred to as a transmission processor, a neighborhood index acquisition section 114b, which may be also referred to as a neighborhood index acquirer, an index storage 115b, a criterion value setting section 116b, which may be also referred to as a criterion value setter, a different-unit anomaly detection section 117b, which may be also referred to as a different-unit anomaly detector, a self-unit anomaly detection section 118b, which may be also referred to as a self-unit anomaly detector, and an anomaly notification processing section 119b, which may be also referred to as an anomaly notification processor.

Similarly to the installation state index specification section 111a, the installation state index specification section 111b specifies an installation state index corresponding to the installation state of the in-vehicle unit 1b on the subject vehicle B based on an illuminance detected by the illuminance sensor 12b, an acceleration detected by the acceleration sensor 13b and an angular speed detected by the gyro sensor 14b. The installation state index signifies at least one of the followings: an illuminance detected by the illuminance sensor 12b; an installation posture angle of the in-vehicle unit 1b; and the time-variable quantity of an installation posture angle of the in-vehicle unit 1b, whichever equally corresponds to that specified by the installation state index specification section 111a.

Similarly to the positioning information acquisition section 112a, the positioning information acquisition section 112b acquires positioning information such as a vehicle position or a traveling direction of the subject vehicle B that is successively detected by the position detector 15b.

The transmission processing section 113b causes the short range communicator 16b to transmit the vehicle position acquired by the positioning information acquisition section 112b by using the vehicle roadside communication. The vehicle roadside communication may transmit the vehicle position when receiving a signal transmitted from the provider terminal 2 based on the vehicle roadside communication transmits. The vehicle roadside communication transmits the vehicle position to the provider terminal 2 and the in-vehicle unit 1b is thereby provided with a service corresponding to the vehicle position from the provider terminal 2.

The neighborhood index acquisition section 114b causes the short range communicator 16b to successively acquire an installation state index about the in-vehicle unit 1a on the nearby vehicle A, positioning information about the nearby vehicle A, and a time stamp indicating the time to detect the positioning information that are transmitted from the in-vehicle unit 1a (i.e., the nearby vehicle A) by using the inter-vehicle communication. The neighborhood index acquisition section 114b stores the acquired installation state index, positioning information, and time stamp associated with each other in the index storage 115b.

The neighborhood index acquisition section 114b stores the received installation state index, positioning information, and time stamp associated with each other in the index storage 115b each time the short range communicator 16b receives an installation state index from the different nearby vehicle A. The index storage 115b stores installation state indexes, positioning informations, and time stamps concerning the in-vehicle units 1a of a plurality of the nearby vehicles A when receiving installation state indexes from a plurality of the nearby vehicles A.

The index storage 115b may store an installation state index associated with an identifier to identify the transmitting in-vehicle unit 1a so as to individually recognize an installation state index received from the different nearby vehicle A.

The neighborhood index acquisition section 114b may re-receive an installation state index from the in-vehicle unit 1a that already stores installation state indexes in the index storage 115b. In such a case, the neighborhood index acquisition section 114b may update the installation state index that is newly received and is already stored. Furthermore, the neighborhood index acquisition section 114b may remove an installation state index from the index storage 115b when the installation state index is not updated for a predetermined period such as several seconds. This can limit installation state indexes stored in the index storage 115b to the installation state indexes concerning the in-vehicle unit 1a positioned within the range of inter-vehicle communication with the in-vehicle unit 1b. The same applies to the positioning information and the time stamp.

The index storage 115b may store a plurality of installation state indexes and corresponding time stamps concerning the same in-vehicle unit 1a.

The criterion value setting section 116b sets a criterion value used as the criterion for the set of installation state indexes from the set of installation state indexes that are received from a plurality of nearby vehicles A and are stored in the index storage 115b. The criterion value setting section 116b sets a criterion value corresponding to each of a plurality of types of positioning capability installation state indexes, if available. For example, the criterion value setting section 116b sets a criterion value concerning illuminance when the type of installation state index corresponds to the illuminance. The same applies to an installation posture angle and the time-variable quantity of the installation posture angle. A process on the criterion value setting section 116b will be described in detail later.

The different-unit anomaly detection section 117b compares an installation state index acquired by the neighborhood index acquisition section 114b with a criterion value set by the criterion value setting section 116b when the installation state index relates to the in-vehicle unit 1a of the nearby vehicle A. The different-unit anomaly detection section 117b detects an abnormal installation state of the in-vehicle unit 1a when the installation state index concerning the in-vehicle unit 1a deviates from the criterion value so that the deviation is greater than or equal to a predetermined value. The different-unit anomaly detection section 117b detects no anomaly when the deviation from the criterion value is smaller than a predetermined value. The predetermined value here is designed so as to be able to suggest occurrence of an abnormal installation state and can be configured as needed.

The self-unit anomaly detection section 118b compares an installation state index specified by the installation state index specification section 111b with a criterion value set by the criterion value setting section 116b when the installation state index relates to the position detector 15b of the subject vehicle B. The self-unit anomaly detection section 118b detects an abnormal installation state of the in-vehicle unit 1b when the installation state index concerning the in-vehicle unit 1b deviates from the criterion value so that the deviation is greater than or equal to the predetermined value. The self-unit anomaly detection section 118b detects no anomaly when the deviation from the criterion value is smaller than the predetermined value.

The different-unit anomaly detection section 117b and the self-unit anomaly detection section 118b are targeted at the same object to be compared. In detail, the installation state index is compared with the criterion value for illuminance when the type of installation state index corresponds to the illuminance. The same applies to an installation posture angle and the time-variable quantity of the installation posture angle.

The anomaly notification processing section 119b causes the wide area communicator 17b to notify the center 3 by using the wide area communication that the different-unit anomaly detection section 117b detects an abnormal installation state of the in-vehicle unit 1a on the nearby vehicle A, if applicable. The anomaly notification processing section 119b causes the wide area communicator 17b to notify the center 3 by using the wide area communication that the self-unit anomaly detection section 118b detects an abnormal installation state of the in-vehicle unit 1b on the subject vehicle B, if applicable. The center 3 receives the notification that an anomaly is detected. An operator takes action against the anomaly, for example.

<Different-Unit Anomaly Detection Related Process on the Controller 11b>

Figure 4:
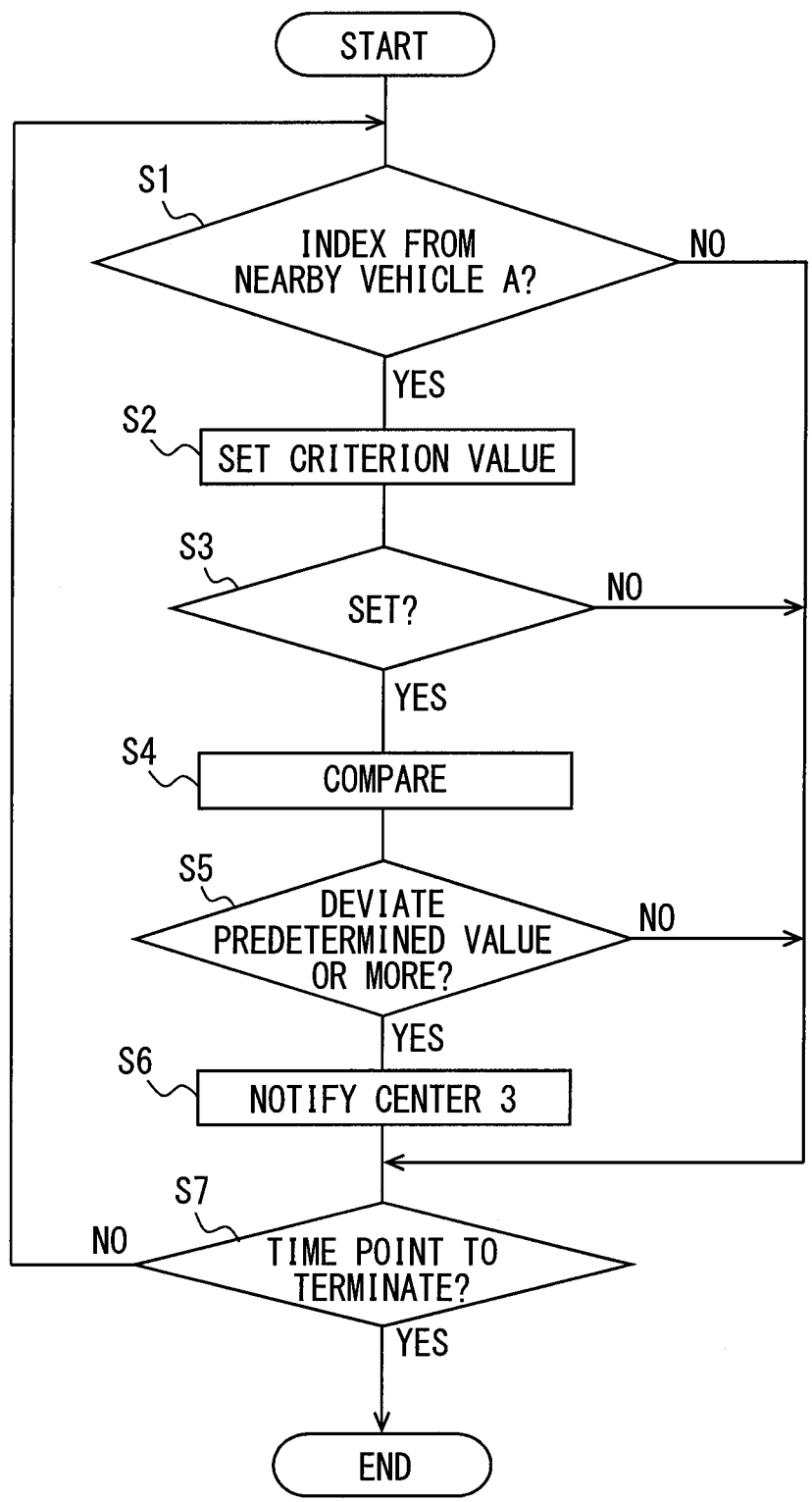
FIG. 4 is a flowchart illustrating a different-unit anomaly detection related process on a controller of the subject vehicle.

A flowchart in FIG. 4 illustrates a flow of a different-unit anomaly detection related process on the controller 11b.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, unit, or specific name (e.g., detector). Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

The different-unit anomaly detection related process relates to detection of an abnormal installation state of the in-vehicle unit 1a on the nearby vehicle A. The flowchart in FIG. 4 may start when an ignition power supply of the subject vehicle B turns on.

At S1, the neighborhood index acquisition section 114b may allow the short range communicator 16b to acquire an installation state index that concerns the in-vehicle unit 1a on the nearby vehicle A and is transmitted from the nearby vehicle A based on the inter-vehicle communication (S1: YES). In this case, the process proceeds to S2. When acquiring the installation state index, the neighborhood index acquisition section 114b uses the index storage 115b to store the installation state index associated with the positioning information and the time stamp that are also acquired. The process proceeds to S7 if non installation state index is acquired (S1: NO).

At S2, the criterion value setting section 116b sets a criterion value from a set of installation state indexes stored in the index storage 115b based on the positioning information and the time stamp acquired at S1 along with the installation state index. The criterion value is set as follows.

Positioning information is extracted from a set of positioning information stored in the index storage 115b based on the positioning information and the time stamp acquired at S1 along with the installation state index. Positioning information to be extracted is detected at the same time to detect the acquired positioning information and approximates to the acquired positioning information. A time difference used to determine almost the same time can be configured as needed. A range of approximation may be configured as needed correspondingly to each type of positioning information.

The range of approximation may use a linear distance that is shorter than a predetermined distance such as several tens of meters when the type of positioning information is latitude/longitude. The range of approximation may use a height difference that falls short of a height difference between an elevated highway and a road under the elevated highway when the type of positioning information is altitude. The range of approximation may use an orientational difference that is assumed to be the same direction when the type of positioning information is traveling direction.

The installation state index associated with the extracted positioning information is extracted from a set of installation state indexes stored in the index storage 115b. A criterion value used as a criterion for the set of extracted installation state indexes is set from the set of extracted installation state indexes. A mode value for the set of extracted installation state indexes may be calculated and the calculated mode value may be used as the criterion value. Alternatively, the criterion value may correspond to an average value for the set of installation state indexes or an intermediate value for the set of installation state indexes.

Environments are also highly likely to be similar when the positioning information approximates to each other. The above-mentioned configuration can therefore extract the installation state index about the nearby vehicle A whose environmental condition is similar to the nearby vehicle A whose installation state index is acquired at S1. The configuration can provide a highly reliable criterion value by reducing noise due to an environmental difference.

The positioning information may use only one of the latitude/longitude, the altitude, and the traveling direction, a combination of these, or whatever else usable as the positioning information.

A favorable configuration is not to settle a criterion value when the number of extracted installation state indexes is smaller than a predetermined plural number. The predetermined plural number here signifies a value that is settled in consideration of the reliability of the criterion value. No criterion value is settled if the condition does not reach a population parameter for enough installation state indexes to settle a fully reliable criterion value. The different-unit anomaly detection section 117b or the self-unit anomaly detection section 118b can be protected against incorrect detection.

The process proceeds to S4 if the criterion value is set at S2 (S3: YES). The process proceeds to S7 if the criterion value is not set (S3: NO). At S4, the different-unit anomaly detection section 117b compares the criterion value set at S2 with the installation state index that is acquired at S1 and concerns the in-vehicle unit 1a on the nearby vehicle A (also referred to as a target nearby vehicle) as a diagnosis target.

At S5, the comparison result at S4 may indicate that the installation state index acquired at S1 concerning the in-vehicle unit 1a on the nearby vehicle A deviates from the criterion value to be greater than or equal to a predetermined value (S5: YES). In this case, an abnormal installation state of the in-vehicle unit 1a on the nearby vehicle A is detected and the process proceeds to S6. The installation state index may deviate from the criterion value to be smaller than a predetermined value (S5: NO). In this case, an abnormal installation state of the in-vehicle unit 1a on the nearby vehicle A is not detected and the process proceeds to S7.

At S6, the anomaly notification processing section 119b causes the wide area communicator 17b to notify the center 3 by using the wide area communication that the process detects the abnormal installation state of the in-vehicle unit 1a on the nearby vehicle A whose installation state index is acquired at S1.

At S7, the different-unit anomaly detection related process terminates if a time point to terminate the different-unit anomaly detection related process is reached (S7: YES). The process returns to S1 and is repeated if a time point to terminate the different-unit anomaly detection related process is not reached (S7: NO). The different-unit anomaly detection related process may terminate when an ignition power supply of the subject vehicle B turns off.

<Self-Unit Anomaly Detection Related Process on the Controller 11b>

Figure 5:
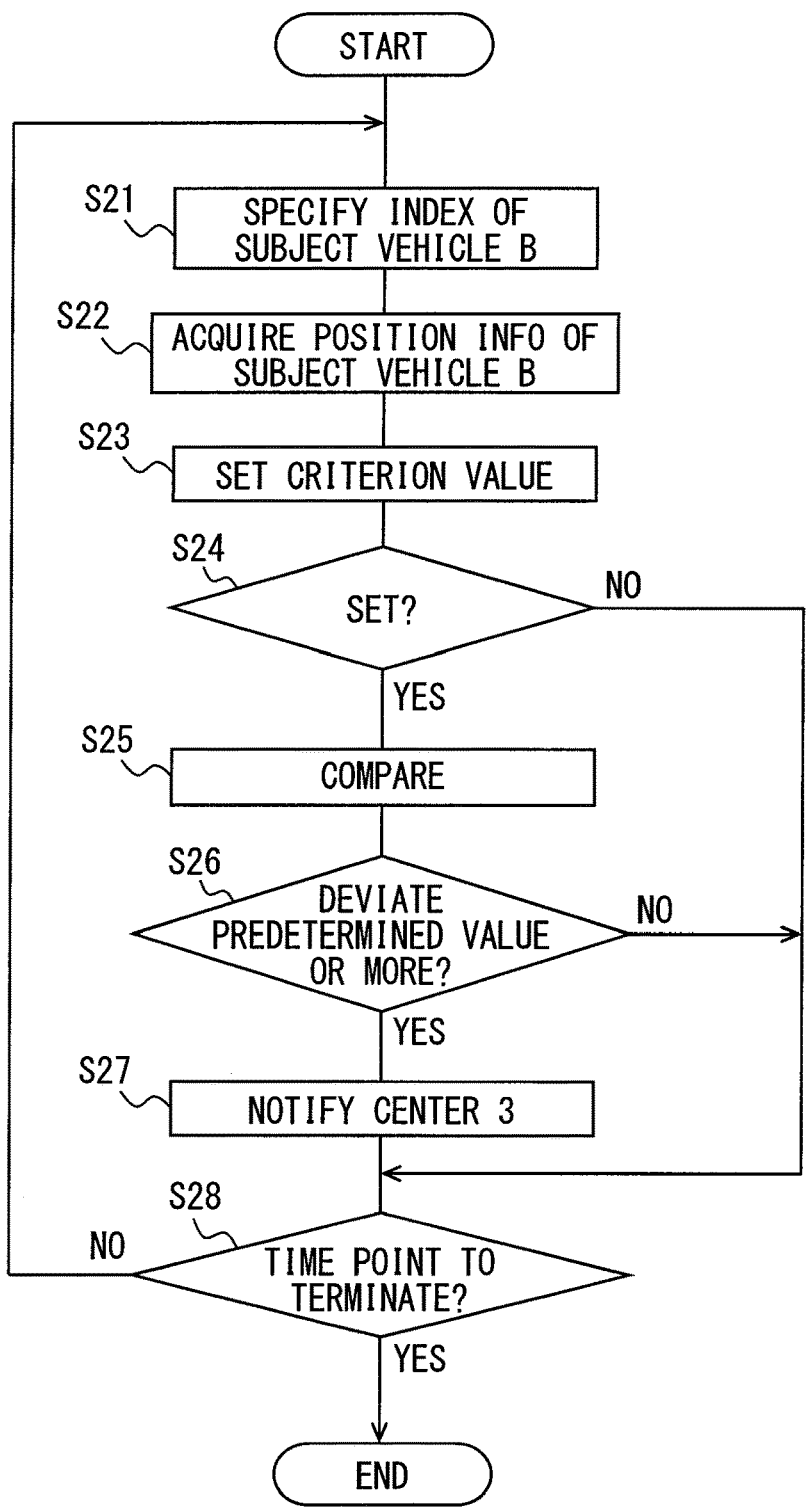
FIG. 5 is a flowchart illustrating a self-unit anomaly detection related process on the controller of the subject vehicle.

A flowchart in FIG. 5 illustrates a flow of a self-unit anomaly detection related process on the controller 11b. The self-unit anomaly detection related process relates to detection of an abnormal installation state of the in-vehicle unit 1b on the subject vehicle B. The flowchart in FIG. 5 may start when an ignition power supply of the subject vehicle B turns on.

At S21, the installation state index specification section 111b specifies an installation state index corresponding to the installation state of the in-vehicle unit 1b on the subject vehicle B based on the illuminance detected by the illuminance sensor 12b, the acceleration detected by the acceleration sensor 13b, and the angular speed detected by the gyro sensor 14b.

At S22, the positioning information acquisition section 112b acquires positioning information about the subject vehicle B detected by the position detector 15b almost at the same time to detect a sensor output value used to specify the installation state index at S21 based on the time stamp indicating the time to detect the positioning information. At S22, the time stamp indicating the time to detect the positioning information is also acquired.

At S23, similarly to S2, the criterion value setting section 116b sets a criterion value from a set of installation state indexes stored in the index storage 115b based on the positioning information and the time stamp acquired at S22. The installation state index about the nearby vehicle A whose environmental condition is similar to the subject vehicle B can thereby be extracted from the index storage 115b and a highly reliable criterion value can be provided by reducing noise due to an environmental difference.

At S24, the process proceeds to S25 if the criterion value is set at S23 (S24: YES). The process proceeds to S28 if the criterion value is not set (S24: NO). At S25, the self-unit anomaly detection section 118b compares the criterion value set at S23 with the installation state index acquired at S21 concerning the in-vehicle unit 1b on the subject vehicle B.

At S26, the comparison result at S25 may indicate that the installation state index acquired at S1 concerning the in-vehicle unit 1b on the subject vehicle B deviates from the criterion value to be greater than or equal to a predetermined value (S26: YES). In this case, an abnormal installation state of the in-vehicle unit 1b on the subject vehicle B is detected and the process proceeds to S27. The installation state index may deviate from the criterion value to be smaller than a predetermined value (S26: NO). In this case, an abnormal installation state of the in-vehicle unit 1b on the subject vehicle B is not detected and the process proceeds to S28.

At S27, the anomaly notification processing section 119b causes the wide area communicator 17b to notify the center 3 by using the wide area communication that the abnormal installation state of the in-vehicle unit 1b on the subject vehicle B is detected.

At S28, the self-unit anomaly detection related process terminates if a time point to terminate the self-unit anomaly detection related process is reached (S28: YES). The process returns to S21 and is repeated if a time point to terminate the self-unit anomaly detection related process is not reached (S28: NO). For example, the self-unit anomaly detection related process may terminate when an ignition power supply of the subject vehicle B turns off.

<Overview of the First Embodiment>

The configuration according to the first embodiment settles a criterion value from installation state indexes concerning the nearby vehicle A whose environmental condition is similar to a vehicle whose abnormal installation state is to be detected. The embodiment can provide a highly reliable criterion value by reducing noise due to an environmental difference. The criterion value is used as a criterion for installation state indexes. Suppose a change occurs and is not limited to particular vehicles. For example, an environmental factor changes the installation state index changes equally on vehicles whose environmental conditions are similar. In such a case, the criterion value also varies with the change. However, an influence on the criterion value is alleviated when a change in the installation state index is limited to particular vehicles. In this case, a variation in the criterion value is suppressed.

The criterion value is therefore compared with the installation state index to accurately detect an abnormal installation state of the in-vehicle unit 1a limited to particular nearby vehicles A or an abnormal installation state of the in-vehicle unit 1b limited to the subject vehicle B as distinguished from a change in the installation state index that is not limited to particular vehicles. Examples are described below.

Suppose the installation state index concerns the illuminance. Even under a similar environment, some vehicles may include the in-vehicle unit 1a or the in-vehicle unit 1b that is not installed on the dashboard as a standard position, but may be placed in the glove box or installed under the dashboard. In such a case, the illuminance deviates from the criterion value and therefore enables accurate detection of an abnormal installation state. The same applies to the installation state index that concerns an installation posture angle or the time-variable quantity of an installation posture angle of the in-vehicle unit 1a or the in-vehicle unit 1b. The installation posture angle or the time-variable quantity of the installation posture angle deviates from the criterion value even under a similar environment when the in-vehicle unit 1a or the in-vehicle unit 1b is installed at a non-standard position. An abnormal installation state is accurately detected.

According to the configuration of the first embodiment, the different-unit anomaly detection section 117b detects an abnormal installation state of the in-vehicle unit 1a on the nearby vehicle A when the installation state index concerning the in-vehicle unit 1a deviates from the criterion value to be greater than or equal to a predetermined value on condition that the short range communicator 16b receives the installation state index from the nearby vehicle A. The different-unit anomaly detection section 117b can accurately detect an abnormal installation state of the in-vehicle unit 1a.

According to the configuration of the first embodiment, the self-unit anomaly detection section 118b detects an abnormal installation state of the in-vehicle unit 1b on the subject vehicle B when the installation state index concerning the in-vehicle unit 1b deviates from the criterion value to be greater than or equal to a predetermined value on condition that the installation state index specification section 111b specifies the installation state index in the subject vehicle B. The self-unit anomaly detection section 118b can accurately detect an abnormal installation state of the in-vehicle unit 1b on the subject vehicle B.

The configuration according to the first embodiment notifies the center 3 of an abnormal installation state of the in-vehicle unit 1a on the nearby vehicle A or the in-vehicle unit 1b on the subject vehicle B. The center 3 can promptly take action against the anomaly. According to the configuration of the first embodiment, the in-vehicle unit 1b of the subject vehicle B causes the wide area communicator 17b to notify the center 3 by using the wide area communication that an abnormal installation state is detected on the in-vehicle unit 1a of the nearby vehicle A. The center can be notified of an abnormal installation state of the in-vehicle unit 1a on the nearby vehicle A even when the nearby vehicle A does not include an apparatus to communicate with the center 3 or such an apparatus, if available, malfunctions.

First Modification

In the first embodiment, the criterion value setting section 116b sets a criterion value by narrowing a set of installation state indexes stored in the index storage 115b to an installation state index received from the nearby vehicle A whose positioning information approximates to a vehicle as a target. However, the configuration is not limited thereto. There may be a configuration (hereinafter referred to as a first modification) that sets a criterion value without narrowing the population by using the positioning information.

The criterion value setting section 116*b* according to the first modification may successively set a criterion value as a criterion for an entire set of installation state indexes from the entire set of installation state indexes that are received from a plurality of nearby vehicles A and are stored in the index storage 115*b*.

The criterion value setting section 116*b* according to the first modification may set a criterion value at a specified cycle. The specified cycle here signifies a time interval that is longer than a period estimated to cause a change in the set of installation state indexes stored in the index storage 115*b*. The specified cycle can be set as needed. Alternatively, the criterion value setting section 116*b* according to the first modification may set a criterion value each time the index storage 115*b* stores a new installation state index.

The different-unit anomaly detection section 117*b* according to the first modification may compare the criterion value most recently set by the criterion value setting section 116*b* with the installation state index that is acquired by the neighborhood index acquisition section 114*b* and concerns the in-vehicle unit 1*a* of the nearby vehicle A. The self-unit anomaly detection section 118*b* according to the first modification may compare the criterion value most recently set by the criterion value setting section 116*b* with the installation state index that is specified by the installation state index specification section 111*b* and concerns the in-vehicle unit 1*b* of the subject vehicle B.

The criterion value set by the criterion value setting section 116*b* is used as a criterion for a set of installation state indexes received from the nearby vehicle A that is positioned so near as to be capable of inter-vehicle communication with the subject vehicle B at the time point. Even the first modification can settle a criterion value that reduces a noise due to an environmental difference by settling the criterion value from an installation state index concerning the nearby vehicle A whose environmental condition is relatively similar to a vehicle as a target. Thus, even the first modification can accurately detect an abnormal installation state of the in-vehicle unit 1*a* on the nearby vehicle A or the in-vehicle unit 1*b* on the subject vehicle B.

Second Modification

In the first embodiment, the criterion value setting section 116*b* sets a criterion value from a set of installation state indexes received from a plurality of nearby vehicles A. However, the configuration is not limited thereto. There may be a configuration in which the criterion value setting section 116*b* sets a criterion value from installation state indexes received from a plurality of nearby vehicles A and a set of installation state indexes that is specified by the installation state index specification section 111*b* and concerns the in-vehicle unit 1*b* of the subject vehicle B. In this case, the index storage 115*b* may store an installation state index that is acquired and specified by the installation state index specification section 111*b* and concerns the in-vehicle unit 1*b* of the subject vehicle B.

Third Modification

In the first embodiment, the anomaly notification processing section 119*b* uses the wide area communication to notify the center 3 of an anomaly detected by the different-unit anomaly detection section 117*b* or the self-unit anomaly detection section 118*b*. However, the configuration is not limited thereto. The subject vehicle B may audiovisually notify an anomaly detected by the different-unit anomaly detection section 117*b* or the self-unit anomaly detection section 118*b*.

Fourth Modification

In the first embodiment, the in-vehicle unit 1*b* includes the different-unit anomaly detection section 117*b* and the self-unit anomaly detection section 118*b*. However, the configuration is not limited thereto. For example, the in-vehicle unit 1*b* does not include the self-unit anomaly detection section 118*b* and does not detect an abnormal installation state of the in-vehicle unit 1*b* on the subject vehicle B. In this case, the in-vehicle unit 1*b* may not include the installation state index specification section 111*b* either in addition to the self-unit anomaly detection section 118*b*.

Fifth Modification

In the first embodiment, the in-vehicle unit 1*b* includes the different-unit anomaly detection section 117*b* and the self-unit anomaly detection section 118*b*. However, the configuration is not limited thereto. For example, the in-vehicle unit 1*b* does not include the different-unit anomaly detection section 117*b* and does not detect an abnormal installation state of the in-vehicle unit 1*a* of the nearby vehicle A.

Sixth Modification

The subject vehicle B and the nearby vehicle A may use an in-vehicle unit that includes the function of the in-vehicle unit 1*a* and the function of the in-vehicle unit 1*b*. Namely, the in-vehicle unit 1*a* may include a function to perform processes equal to those of the transmission processing section 113*b*, the neighborhood index acquisition section 114*b*, the index storage 115*b*, the criterion value setting section 116*b*, the different-unit anomaly detection section 117*b*, the self-unit anomaly detection section 118*b*, and the anomaly notification processing section 119*b*. The in-vehicle unit 1*b* may include a function to perform a process equal to that of the transmission processing section 113*a*.

Seventh Modification

The first embodiment has been described by using a roadside instrument installed at the roadside as an example of the provider terminal 2 but is not limited thereto. The provider terminal 2 may be installed on a mobile object such as a car.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

What is claimed is:

1. An in-vehicle unit that is used in each of a plurality of host vehicles including a subject vehicle and a plurality of nearby vehicles near the subject vehicle, the in-vehicle unit including an inter-vehicle communicator to transmit and receive information using inter-vehicle communication, the in-vehicle unit used in the subject vehicle, comprising:

a criterion value setting section that receives a different-unit installation state index that is transmitted via the inter-vehicle communicator using the inter-vehicle communication and sets successively a criterion value of an installation state index from the received different-unit installation state index, the different-unit installation state index being specified based on an output value from a sensor instrument that successively outputs an output value corresponding to an installation state of the in-vehicle unit on each of the nearby vehicles; and a different-unit anomaly detection section that detects an abnormal installation state of the in-vehicle unit on a target nearby vehicle that is a predetermined diagnosis target among the nearby vehicles
by comparing the criterion value set by the criterion value setting section with the different-unit installation state index received via the inter-vehicle communicator from the target nearby vehicle.

2. The in-vehicle unit according to claim 1, wherein the in-vehicle unit used in the subject vehicle includes:
a sensor instrument that successively outputs an output value corresponding to an installation state of the in-vehicle unit on the subject vehicle;
a self-unit installation state index specification section that specifies a self-unit installation state index concerning the in-vehicle unit in the subject vehicle based on an output value from the sensor instrument in the in-vehicle unit in the subject vehicle; and
a self-unit anomaly detection section that detects an abnormal installation state of the in-vehicle unit on the subject vehicle
by comparing the criterion value set by the criterion value setting section with the self-unit installation state index specified by the self-unit installation state index specification section.

3. The in-vehicle unit according to claim 2, wherein the in-vehicle unit used in the subject vehicle includes:
a wide area communicator that communicates with a center via a communication network; and
a self-unit anomaly notification processing section that causes the wide area communicator to notify the center that the self-unit anomaly detection section detects an abnormal installation state of the in-vehicle unit on the subject vehicle.

4. The in-vehicle unit according to claim 2,
wherein the in-vehicle unit used in the subject vehicle receives, via the inter-vehicle communicator using the inter-communication, different-unit positioning information that is successively detected in the nearby vehicles by using a satellite positioning system, in addition to the different-unit installation state index transmitted from the nearby vehicles, and
wherein the in-vehicle unit used in the subject vehicle includes:
a positioning information acquisition section that acquires self-unit positioning information about the subject vehicle, the self-unit positioning information being successively detected in the subject vehicle by using the satellite positioning system,
wherein the self-unit anomaly detection section detects an abnormal installation state of the in-vehicle unit on the subject vehicle
by comparing the self-unit installation state index specified by the self-unit installation state index specification section with a criterion value set by the criterion value setting section,
the criterion value being set based on a different-unit installation state index received from a nearby vehicle whose different-unit positioning information approximates to the self-unit positioning information of the subject vehicle, among the different-unit installation state indexes received from the nearby vehicles via the inter-vehicle communicator.

5. The in-vehicle unit according to claim 1, wherein the in-vehicle unit used in the subject vehicle includes:
a wide area communicator that communicates with a center via a communication network; and a different-unit anomaly notification processing section that causes the wide area communicator to notify the center that the different-unit anomaly detection section detects an abnormal installation state of the in-vehicle unit on the target nearby vehicle.

6. The in-vehicle unit according to claim 1,
wherein:
the in-vehicle unit used in the subject vehicle receives, via the inter-vehicle communicator using the inter-vehicle communication, different-unit positioning information successively output from the nearby vehicles by using a satellite positioning system, in addition to the different-unit installation state index transmitted from the nearby vehicles; and
the different-unit anomaly detection section detects an abnormal installation state of the in-vehicle unit on the target nearby vehicle
by comparing the different-unit installation state index received from the target nearby vehicle with a criterion value set by the criterion value setting section,
the criterion value being set based on a different-unit installation state index received from a nearby vehicle whose different-unit positioning information approximates to the different-unit installation information of the target nearby vehicle, among the different-unit installation state indexes received from the nearby vehicles via the inter-vehicle communicator.

7. An in-vehicle unit that is used in each of a plurality of host vehicles including a subject vehicle and at least one nearby vehicle near the subject vehicle,
each in-vehicle unit comprising:
a sensor instrument that successively outputs an output value corresponding to an installation state of the in-vehicle unit on each of the host vehicles; and
an inter-vehicle communicator that transmits and receives information using inter-vehicle communication,
the in-vehicle unit used in the subject vehicle, comprising:
a criterion value setting section that
receives a different-unit installation state index that is transmitted via the inter-vehicle communicator using the inter-vehicle communication and
sets successively a criterion value of an installation state index from the received different-unit installation state index,
the different-unit installation state index being specified based on an output value from the sensor instrument that successively outputs an output value corresponding to an installation state of the in-vehicle unit on each of the at least one nearby vehicle;
a self-unit installation state index specification section that specifies a self-unit installation state index concerning the in-vehicle unit in the subject vehicle based on an output value from the sensor instrument in the in-vehicle unit in the subject vehicle; and
a self-unit anomaly detection section that detects an abnormal installation state of the in-vehicle unit on the subject vehicle
by comparing the criterion value set by the criterion value setting section with the self-unit installation state index specified by the self-unit installation state index specification section.

8. The in-vehicle unit according to claim 7, wherein the in-vehicle unit used in the subject vehicle includes:
a wide area communicator that communicates with a center via a communication network; and a self-unit anomaly notification processing section that causes the wide area communicator to notify the center that the self-unit anomaly detection section detects an abnormal installation state of the in-vehicle unit on the subject vehicle.

9. The in-vehicle unit according to claim 7,
wherein the in-vehicle unit used in the subject vehicle receives, via the inter-vehicle communicator using the inter-communication, different-unit positioning information that is successively detected in the at least one nearby vehicle by using a satellite positioning system, in addition to the different-unit installation state index transmitted from the at least one nearby vehicle, and
wherein the in-vehicle unit used in the subject vehicle includes:
a positioning information acquisition section that acquires self-unit positioning information about the subject vehicle, the self-unit positioning information being successively detected in the subject vehicle by using the satellite positioning system,
wherein the self-unit anomaly detection section detects an abnormal installation state of the in-vehicle unit on the subject vehicle
by comparing the self-unit installation state index specified by the self-unit installation state index specification section with a criterion value set by the criterion value setting section,
the criterion value being set based on a different-unit installation state index received from a nearby vehicle whose different-unit positioning information approximates to the self-unit positioning information of the subject vehicle, among the different-unit installation state index received from the at least one nearby vehicle via the inter-vehicle communicator.

10. The in-vehicle unit according to claim 1, wherein the sensor instrument includes an iluminance sensor.

11. The in-vehicle unit according to claim 1, wherein the sensor instrument includes an inertial sensor.

* * * * *